US011289773B2

(12) United States Patent
Okada et al.

(10) Patent No.: US 11,289,773 B2
(45) Date of Patent: Mar. 29, 2022

(54) POWER SUPPLY DEVICE, VEHICLE USING SAME, BUS BAR, AND ELECTRICAL CONNECTION METHOD FOR BATTERY CELL USING SAME BUS BAR

(71) Applicant: SANYO Electric Co., Ltd., Daito (JP)

(72) Inventors: Wataru Okada, Hyogo (JP); Shinji Ota, Hyogo (JP); Tetsuya Shiizaki, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 856 days.

(21) Appl. No.: 16/071,426

(22) PCT Filed: Jan. 12, 2017

(86) PCT No.: PCT/JP2017/000712
§ 371 (c)(1),
(2) Date: Jul. 19, 2018

(87) PCT Pub. No.: WO2017/130706
PCT Pub. Date: Aug. 3, 2017

(65) Prior Publication Data
US 2021/0210821 A1    Jul. 8, 2021

(30) Foreign Application Priority Data
Jan. 29, 2016    (JP) .............................. JP2016-016616

(51) Int. Cl.
*H01M 50/502*    (2021.01)
*B23K 26/21*    (2014.01)
(Continued)

(52) U.S. Cl.
CPC ........... *H01M 50/502* (2021.01); *B23K 26/21* (2015.10); *H01M 10/0413* (2013.01);
(Continued)

(58) Field of Classification Search
CPC .............. B23K 26/21; H01M 10/0413; H01M 10/0525; H01M 2220/20; H01M 50/20;
(Continued)

(56) References Cited

U.S. PATENT DOCUMENTS

2013/0157113 A1    6/2013    Yoshioka et al.
2014/0099543 A1    4/2014    Oda et al.
(Continued)

FOREIGN PATENT DOCUMENTS

CN    103534838 A    1/2014
JP    H06-096809 A    4/1994
(Continued)

OTHER PUBLICATIONS

English Translation of Search Report dated Sep. 27, 2020, issued in counterpart CN Application No. 201780008691.1.
(Continued)

*Primary Examiner* — Victoria H Lynch
(74) *Attorney, Agent, or Firm* — Westerman, Hattori, Daniels & Adrian, LLP

(57) ABSTRACT

A power supply device has; a battery stacked body where a plural sheets of battery cells each having a positive electrode terminal and a negative electrode terminal at one surface thereof are stacked; and a plurality of bus bars which connect the electrode terminals in the battery cells adjacently disposed. Each of the bus bars partially has a thin area whose thickness is thinner than a thickness of the other area, and an open window formed in the dun area, and opening a portion thereof. The thin area is formed in an oval shape elongated in the battery cell stacking direction, and the open window extends in a direction along the length of the oval shape. This configuration allows the thin area, above and below the length side of the oval shaped thin area, to be secured as a joining area for laser welding or the like.

15 Claims, 19 Drawing Sheets

(51) Int. Cl.
  *H01M 50/543* (2021.01)
  *H01M 50/204* (2021.01)
  *H01M 10/04* (2006.01)
  *H01M 10/0525* (2010.01)

(52) U.S. Cl.
  CPC ....... *H01M 50/204* (2021.01); *H01M 50/543* (2021.01); *H01M 10/0525* (2013.01); *H01M 2220/20* (2013.01)

(58) Field of Classification Search
  CPC .. H01M 50/204; H01M 50/50; H01M 50/502; H01M 50/543; Y02E 60/10
  See application file for complete search history.

(56) References Cited

U.S. PATENT DOCUMENTS

| | | |
|---|---|---|
| 2015/0140391 A1 | 5/2015 | Sakate et al. |
| 2015/0333312 A1* | 11/2015 | Nakamoto ........ H01M 50/502 429/153 |
| 2017/0092978 A1 | 3/2017 | Yoshioka et al. |

FOREIGN PATENT DOCUMENTS

| | | |
|---|---|---|
| JP | 2009-87735 A | 4/2009 |
| JP | 2013-145739 A | 7/2013 |
| JP | 2015-95402 A | 5/2015 |
| JP | 2015-99759 A | 5/2015 |
| WO | 2012/165567 A1 | 12/2012 |
| WO | 2014/050329 A1 | 4/2014 |

OTHER PUBLICATIONS

International Search Report dated Feb. 28, 2017, issued in counterpart International Application No. PCT/JP2017/000712 (2 pages).
Office Action dated Dec. 1, 2020, issued in counterpart JP Application No. 2017-563786, with English translation (8 pages).

* cited by examiner

POWER SUPPLY DEVICE, VEHICLE USING SAME, BUS BAR, AND ELECTRICAL CONNECTION METHOD FOR BATTERY CELL USING SAME BUS BAR

TECHNICAL FIELD

The present invention relates to a power supply device and a vehicle using this, and a bus bar and an electrical connection method for battery cells. For example, the present invention relates to the power supply device where the bus bar is laser welded to the electrode terminal at a time of connecting a plurality of battery cells in series or parallel through the bus bar.

BACKGROUND ART

A power supply device can increase an output voltage by connecting a plurality of battery cells in series, and can increase a current of charging or discharging by connecting the plurality of battery cells in parallel. For example, the power supply device for a large current and a large output, is used as a power source of a motor which drives a vehicle. This power supply device can increase the output voltage by connecting the plurality of battery cells in series. In the power supply device used in this usage, the plurality of battery cells are connected in series by bus bars. The bus bars are connected to electrode terminals of the battery cells constituting the power supply device, by laser welding. In this connecting structure, a through hole is provided in the bus bar, and the electrode terminal is inserted into the though hole. Then, by irradiating the laser beam at the boundary between the inserted electrode terminal and the bus bar, the electrode terminal and the bus bar are melted, connected at the boundary.

As one example of this configuration, the power supply device described in the following Patent Literature 1 is known. The power supply device described in the following Patent Literature 1, has battery cells which each have an electrode terminal where a projection of a cylindrical shape is formed, and bus bars which electrically connects the adjacent battery cells. The bus bar has an open window into which the projection formed at the electrode terminal is inserted. Then, a thin area surrounding the open window is formed. By pressing the bus bar to the electrode terminal, the bus bar and the electrode terminal closely contact. In this state, by scanning the thin area with the laser beam along the projection of the cylindrical shape, both of the bus bar and the electrode terminal are melted, and then the bus bar and the electrode terminal are joined. When the electrode terminal and the bus bar do not closely contact, the welding strength is remarkably decreased. Therefore, the configuration where the bus bar is pressed by a jig, is utilized, in order to press the bus bar toward the electrode terminal at a time of welding.

CITATION LIST

Patent Literature

Patent Literature 1: Unexamined Japanese Patent Publication No. 2015-99759

SUMMARY OF THE INVENTION

Recently, it is increased that the power supply device is used iii many kinds of uses. In the power supply device to which the high voltage is required, a lot of battery cells are connected in series. In this case, in order to secure an insulation distance, walls made of a resin having an insulation property are provided between the adjacent bus bars.

However, in the power supply device of Patent Literature 1, when the walls made of the insulating resin are provided between the adjacent bus bars, a size of the jig for pressing the bus bar is also restricted. Therefore, there is a possibility that the bus bar is not surely pressed toward the electrode terminal. On the other hand, when a welding region is made small in order to secure a space of the jig, the welding strength of the bus bar is reduced.

The present invention has been made in view of the above background. One of its purposes is to provide a power supply device and a vehicle using this, a bus bar and a manufacturing method of a power supply device, in which the strength of a connection can be ensured while a reduction in size of a bus bar is maintained.

A power supply device of one aspect of the present invention, includes: a battery stacked body including a pair of battery cells which are adjacently stacked and each have an electrode terminal; and a bus bar electrically connecting the pair of battery cells. The pair of battery cells have the electrode terminals on a surface of the battery stacked body. This power supply device further has a joining portion joining the electrode terminal of one of the pair of battery cells to the bus bar. The joining portion includes an elliptic joining portion which joins the electrode terminal to the bus bar in an elliptic shape.

According to the above configuration, by joining the electrode terminal and the bus bar in the elliptic shape, spaces where a jig presses the bus bar above and below in a direction of a short diameter can be secured. Therefore, the bus bar is surely pressed toward the electrode terminal. While the electrode terminal and the bus bar closely contact, the connecting strength between the bas bar and the electrode terminal can be secured.

A power supply device of another aspect of the present invention, includes: a battery stacked body including a pair of battery cells which are adjacently stacked and each have an electrode terminal; and a bus bar electrically connecting the pair of battery cells. The pair of battery cells have the electrode terminals on a surface of the battery stacked body. The electrode terminal includes a terminal base having a joining surface. The bus bar is disposed so as to overlap the joining surface and the bus bar. The bus bar also has an open window which exposes a part of the joining surface of the terminal base.

This power supply device further has a joining portion joining the electrode terminal of one of the pair of battery cells to the bus bar. The joining portion includes a plurality of linear joining portions which join the electrode terminal and the bus bar in a linear shape, and between which the open window is located.

According to the above configuration, since the electrode terminal and the bus bar are joined by the plurality of linear joining portions, a size of the open window in the direction perpendicular to the linear joining portion, can be made small, and spaces where a jig presses the bus bar above and below in the direction perpendicular to the linear joining portion, can be secured. Therefore, the bus bar is surely pressed toward the electrode terminal. While the electrode terminal and the bus bar closely contact, the connecting strength between the bas bar and the electrode terminal can be secured.

In a bus bar of another aspect of the present invention, the bus bar for connecting electrode terminals of battery cells, includes a thin area, and the other area. The bus bar partially has a thin area whose thickness is thinner than a thickness of the other area, an open window is opened and formed at a part of the thin area, the thin area has an elongated elliptic shape in a stacked direction of the battery cells, and the open window is extended in a direction along a long side of the elliptic shape.

This configuration allows the thin area, above and below the length side of the oval or elliptic shaped thin area, to be secured as a joining area for laser welding or the like, and allows the joining strength between the bus bars and the electrode terminals to be guaranteed.

In an electrical connection method of battery cells of another aspect of the present invention, the electrical connection method of the battery cells, for electrically connecting a pair of battery cells having electrode terminals, includes: a step of disposing the pair of battery cells adjacently in a posture where the electrode terminals of the battery cells are adjacent to each other; a step of preparing a bus bar, which has an open window of an elongated hole shape, and partially has a thin area whose thickness is thinner than a thickness of the other area; a step of positioning the bus bar by inserting a part of the electrode terminal into the open window, a step of disposing the bus bar on the electrode terminal so as to overlap the thin area to the electrode terminal; a step of pressing the bus bar to the electrode terminal by using a jig which presses the bus bar; and a step of welding and joining the bus bar and the electrode terminal by scanning a laser beam in an elliptic shape at the thin area.

According to the above configuration, by joining the electrode terminal and the bus bar in the elliptic shape, spaces where a jig presses the bus bar above and below in a direction of a short diameter can be secured. Therefore, the bus bar is surely pressed toward the electrode terminal. While the electrode terminal and the bus bar closely contact, the connecting strength between the bas bar and the electrode terminal can be secured.

In an electrical connection method of battery cells of another aspect of the present invention, a manufacturing method of a power supply device connects electrode terminals of the adjacent battery cells by a bus bar, in a state where a plural sheets of battery cells each having a positive electrode terminal and a negative electrode terminal are stacked. In a state where a plural sheets of battery cells each having a positive electrode terminal and a negative electrode terminal are stacked, the method includes:

a step of
disposing the bus bar on the electrode terminals of the adjacent battery cells disposing the bus bar while positioning the bus bar on the electrode terminals which are exposed from open windows which are extended in a direction along a long side of the elliptic shape, are opened and formed at a part of the thin area whose thickness is thinner than a thickness of the other area, and which has an elongated elliptic shape in a stacked direction of the battery cells, a step of welding and joining the bus bar and the electrode terminals, by scanning the laser beam at least on the thin area above and below the length side of the elliptic shape.

This configuration allows the thin area, above and below the length side of the oval or elliptic shaped thin area, to be secured as a joining area for laser welding or the like, and allows the joining strength between the bus bars and the electrode terminals to be guaranteed.

DESCRIPTION OF EMBODIMENT

An exemplary embodiment of the present invention is described below with reference to the drawings. However, the exemplary embodiment described below shows an example of the present invention, and the battery pack of the present invention is not limited to the following. Further, in the present description, components shown in the scope of claims are not limited to the components of the exemplary embodiment. Furthermore, in the following description, the same names or the same reference marks denote the same components or same type components, and detailed description is appropriately omitted. Further, regarding the elements constituting the present Invention, a plurality of elements may be formed of the same component, and one component may serve as the plurality of elements. To the contrary, the function of one component may be shared by the plurality of components.

The power supply device of the present invention is used for various purposes, such as a power supply mounted on a powered vehicle such as a hybrid vehicle or an electric vehicle for supplying power to a travel motor, a power supply for storing power generated by natural energy such as photovoltaic power generation or wind-power generation, or a power supply for storing night power, and are particularly used as a power supply preferable for large power and large current.

Figure 1:
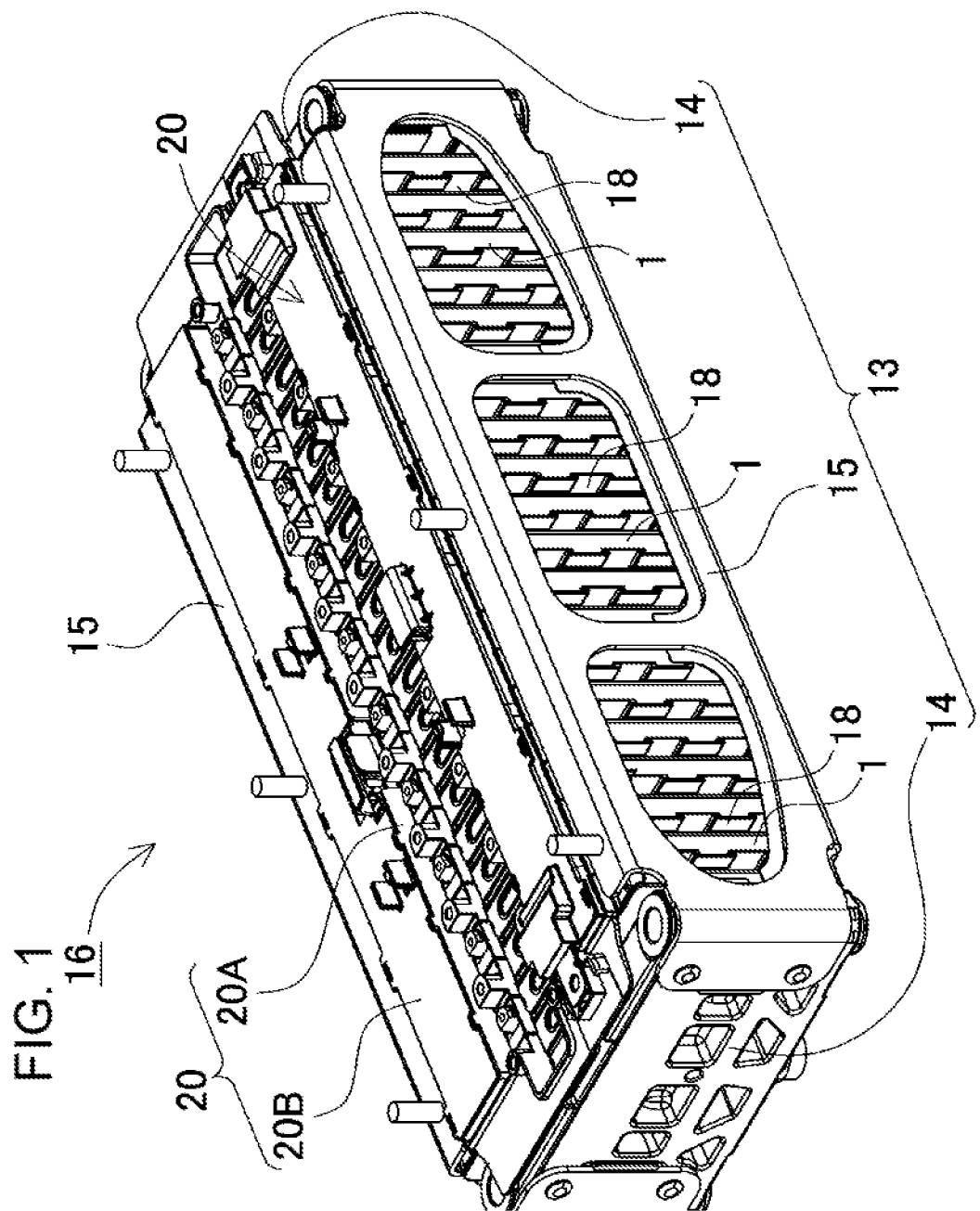
FIG. 1 is a perspective view of a power supply device according to one exemplary embodiment of the present invention.

In a power supply device shown in FIG. 1, a plurality of battery cells 1 are fixed in a stacked state where each of insulating separators 18 is Interposed between the plurality of battery cells 1 and battery cells 1 are insulated each other. In FIG. 1, as one example of battery cell 1, battery cell 1 is a rectangular parallelepiped battery (prismatic battery). Battery cell 1 is a lithium ion secondary battery or the like. However, in the power supply device according to the present invention, the battery cell is not limited to the rectangular parallelepiped battery, the lithium ion secondary battery. As the battery cell, for example, a non-aqueous electrolyte secondary battery or a nickel-hydrogen battery cell other than the lithium ion secondary battery, can also be used.

(Rectangular Battery)

Figure 2:
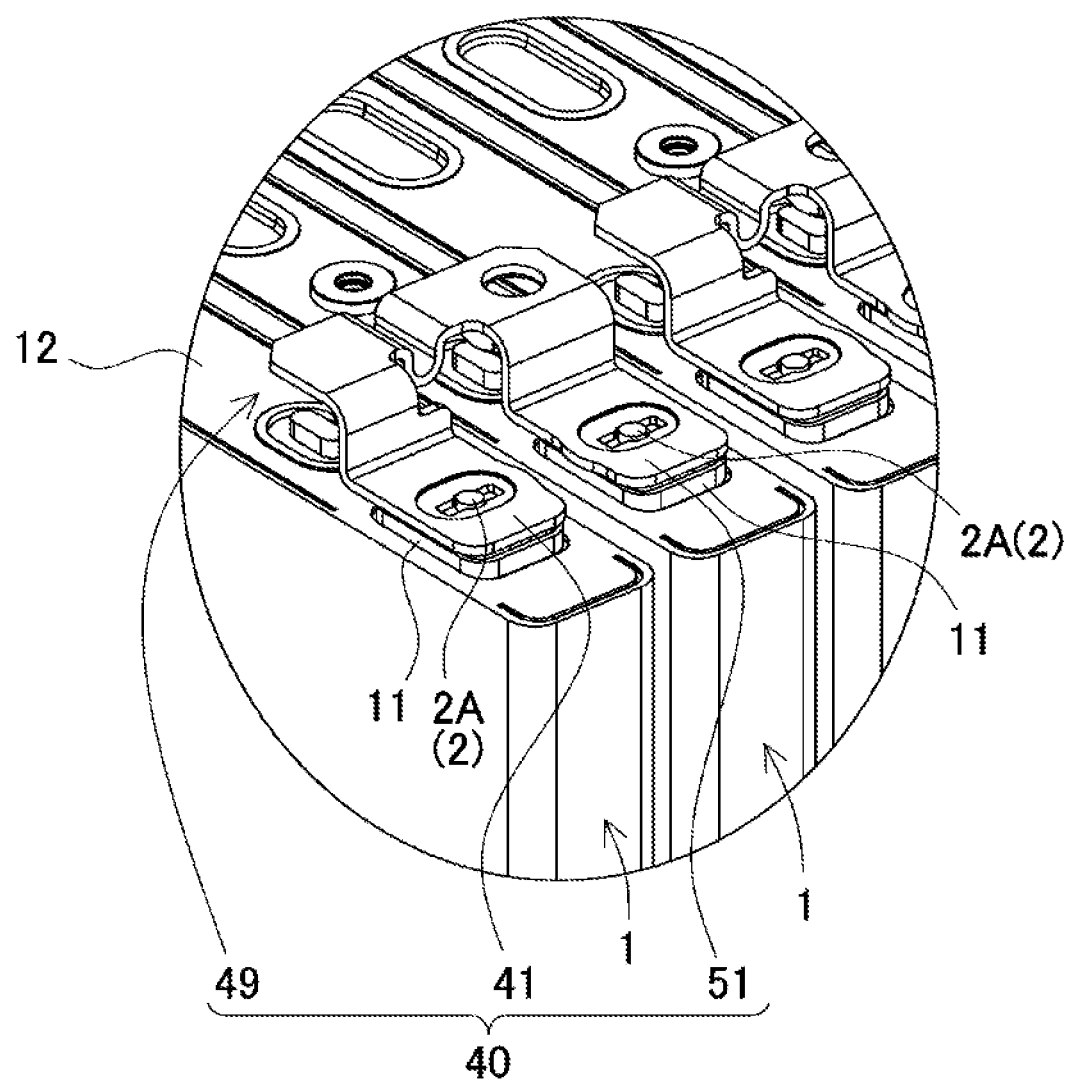
FIG. 2 is a schematic perspective view illustrating a connecting structure of battery cells and bus bars of the power supply device illustrated in FIG. 1.
Figure 3:
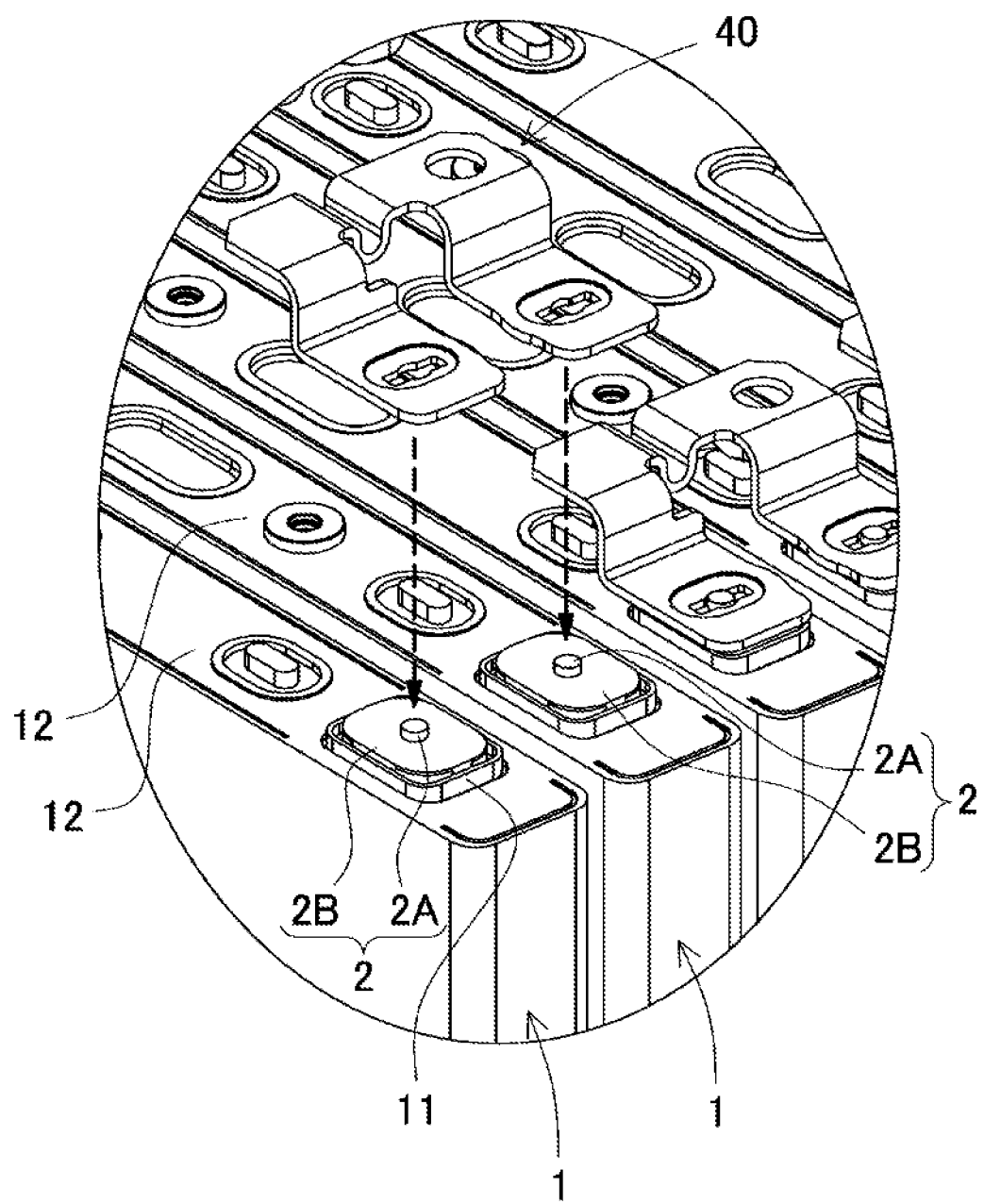
FIG. 3 is an exploded perspective view illustrating the connecting structure of the battery cells and the bus bars illustrated in FIG. 2.

As illustrated in FIGS. 2 and 3, battery cell 1 of the rectangular battery is provided with positive and negative electrode terminals 2 fixed on sealing plate 12 through insulating member 11. In FIGS. 2 and 3, in order to simply explain the connecting state between battery cells 1 and bus bars 40, insulating separators 18 stacked between battery cells 1 are omitted. Bus bar holder 20 (shown in FIG. 1, explained below in detail) which disposes bus bars 40 in a fixed position, is also omitted. Each of positive and negative electrode terminals 2 includes a terminal base having joining surface 2B, and projecting portion 2A projecting from joining surface 2B. Joining surface 2B is plane in parallel with a surface of sealing plate 12. Further, projecting portion 2A is provided at a center of this Joining surface 2B. Electrode terminal 2 shown in FIG. 3, has a cylindrical shape of projecting portion 2A. Here, the projecting portion is not necessarily of the cylindrical shape, but may be of a polygonal column shape or an elliptic cylinder shape.

Stacked battery cells 1 is a rectangular parallelepiped of battery block 16 which is fixed in a predetermined position by fixing parts 13. Fixing parts 13 includes a pair of end plates 14 disposed on both end faces of stacked battery cells 1 and binding members 15 that fixes stacked battery cells 1 in a pressurized state with both ends being fixed to end plates 4.

In battery block 16, battery cells 1 are stacked such that the surfaces having electrode terminals 2 of battery cells 1, that is, sealing plates 12 in FIG. 2, are disposed in the same plane. In the power supply device shown in FIGS. 1 and 2, positive and negative electrode terminals 2 are disposed on the upper surface of battery block 16. In battery block 16, battery cells 1 are stacked in a state where positive and negative electrode terminals 2 at both end portions of sealing plates 12 are horizontally reversed. As shown in FIG. 3, adjacent electrode terminals 2 are coupled by bus bars 40 of metal boards at both sides of battery block 16, and thereby battery cells 1 are electrically connected in series.

Both end portions of bus bars 40 are connected to positive and negative electrode terminals 2, and thereby battery cells 1 are electrically connected in series or in parallel. The power supply device obtained by connecting battery cells 1 in series can increase an output voltage. The power supply device obtained by connecting battery cells 1 in series and parallel can increase an output voltage and an output current.

Bus bar 40 has positioning portions which can guide on electrode terminals 2. Bus bars 40 shown in FIGS. 2 and 3 each have open windows 62 at both ends thereof as one example of the positioning portion. Projecting portion 2A of electrode terminal 2 in adjacently disposed battery cell 1 is guided into each of open windows 62. Bus bars 40 shown in FIGS. 2 and 3 each have open windows 62 of through holes, and then projecting portion 2A is inserted into open window 62. Open window 62 has an inner diameter which can guide projecting portion 2A of electrode terminal 2. Also, the positioning portion of the bus bar is not limited to the through hole. Then, any shape which can position the bus bar by using projecting portion 2A of electrode terminal 2, can be available. As not shown in the figures, for example, the positioning portion can be a cutout portion where the bus bar is partially cut out.

(Bus Bar Holder 20)

Bus bars 40 are disposed at the fixed location by bus bar holders 20 shown in FIG. 1, and guide projecting portions 2A of electrode terminal 2 into open windows 62. Bus bar holder 20 is molded and made of insulating material of plastic or the like, and disposes bus bars 40 at the fixed location. Bus bar holder 20 is coupled to battery block 16, and disposes bus bars 40 at the fixed location. Bus bar holder 20 is coupled to insulating separator 18 stacked between the rectangular batteries, and then is disposed at the fixed position. Alternatively, bus bar holder 20 is coupled to the rectangular batteries, and then is coupled at the fixed position. Bus bar holder 20 shown in FIG. 1 includes holder body 20A frame-shaped which disposes the plurality of bus bars 40 at the fixed location, cover plate 20B which closes the upper opening portion of holder body 20A. Holder body 20A is disposed on the upper surface of battery block 16 in a state where the plurality of bus bars 40 are disposed at the fixed location. Here, open windows 62 of each of bus bars 40 are disposed at projecting portions 2A of electrode terminals 2. Further, in this state, the laser beam is irradiated from the upper opening portion of holder body 20A, bus bar 40 is welded to electrode terminals 2. After all of bus bars 40 are welded to electrode terminals 2, cover plate 20B closes the upper opening portion of holder body 20A.

(Bus Bar 40)

Figure 4:
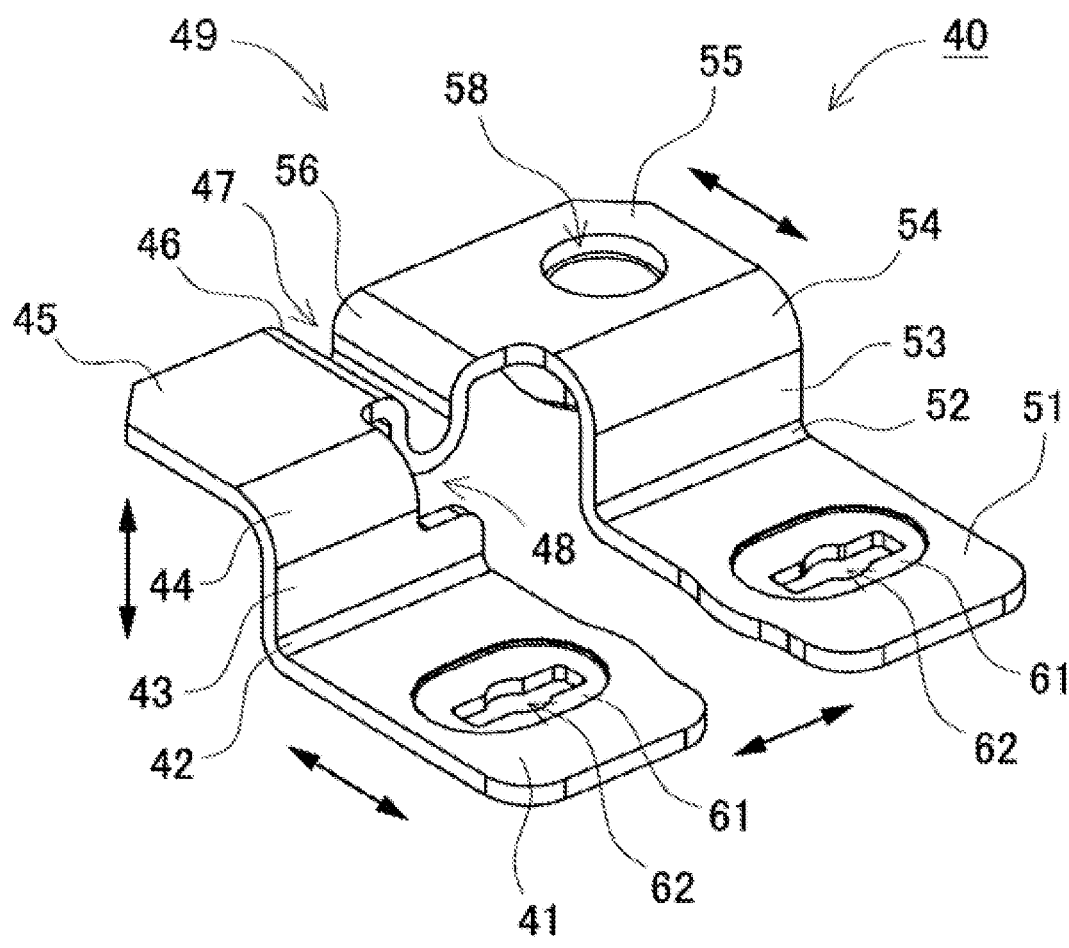
FIG. 4 is a perspective view illustrating the bus bars of FIG. 3.

The perspective view of bus bar 40 is shown in FIG. 4. This bus bar 40 has first connection portion 41, second connection portion 51, and connecting portion 49 which connects these. These portions are integrally made by bending a metal board. Bus bar 40 is made of material having excellent conductivity. Preferably, the material is aluminum, copper, or the like.

First connection portion 41 is connected to electrode terminal 2 (at the left side in FIG. 3) of one of the battery cells. Second connection portion 51 is connected to electrode terminal 2 (at the right side in FIG. 3) of another of the battery cells. First connection portion 41 and second connection portion 51 is adjacently disposed, substantially in parallel. Thereby, in a stacked battery cell assembly where the sealing plates are disposed in the same plane, adjacent electrode terminals 2 can be connected each other. As shown in FIGS. 3 and 4, open windows 62 are formed at first connection portion 41, second connection portion 51 respectively.

(Connecting Portion 49)

First connection portion 41 and second connection portion 51 are connected through connecting portion 49. Connecting portion 49 has first bending portion 43, first intermediate portion 45, second bending portion 53, second intermediate portion 55, and third bending portion 47. First connection portion 41 and first intermediate portion 45 are connected through first bending portion 43. Second connection portion 51 and second intermediate portion 55 are connected through second bending portion 53. First intermediate portion 45 and second intermediate portion 55 are connected through third bending portion 47.

(First Bending Portion 43)

First bending portion 43 is bended at first connection bending area 42 from first connection portion 41, and is also bended at first intermediate bending area 44 between first intermediate portion 45 and first bending portion 43. Preferably, first connection bending area 42 between first bending portion 43 and first connection portion 41, is bended at a substantially right angle. Preferably, first intermediate bending area 44 between first bending portion 43 and first intermediate portion 45, is also bended at a substantially right angle. Then, first connection portion 41, first bending portion 43, and first intermediate portion 45, are formed in a step. These first connection portion 41, first bending portion 43, and first intermediate portion 45, are formed by bending a sheet of a metal board. Only first connection portion 41 is fixed to the battery cell. Then, first intermediate portion 45 is not fixed, and is floating against the battery cell. Therefore, even though a distance between first connection portion 41 and first intermediate portion 45 changes relatively, first connection bending area 42 and first intermediate bending area 44 in first bending portion 43 are deformed by their bending, and thereby this change can be absorbed.

(Second Bending Portion 53)

In the same way, second bending portion 53 is bended at second connection bending area 52 from second connection portion 51, and is also bended at second intermediate bending area 54 between second intermediate portion 55 and second bending portion 53. Preferably, second connection bending area 52 between second bending portion 53 and second connection portion 51, is bended at a substantially right angle. Preferably, second intermediate bending area 54 between second bending portion 53 and second intermediate portion 55, is also bended at a substantially right angle. Then, second connection portion 51, second bending portion 53, and second Intermediate portion 55, are formed in a step. These second connection portion 51, second bending portion 53, and second intermediate portion 55, are formed by bending a sheet of a metal board. Second connection portion 51 side is fixed to the battery cell. Then, second intermediate portion 55 is not fixed. Therefore, even though a distance between second connection portion 51 and second intermediate portion 55 changes relatively, this change can be absorbed by second connection bending area 52 and second intermediate bending area 54 in second bending portion 53.

(Third Bending Portion 47)

First intermediate portion 45 and second intermediate portion 55 are connected through third bending portion 47. Concretely, first intermediate portion 45 and third bending portion 47 are connected through third intermediate bending area 46. Then, second intermediate portion 55 and third bending portion 47 are connected through fourth intermediate bending area 56. Preferably, third bending portion 47 is formed by bending the same metal board as first intermediate portion 45 and second intermediate portion 55. Third bending portion 47 is formed in a U-shape in the vertical cross-section view. Therefore, by deforming in this portion, even though a distance between first intermediate portion 45 and second intermediate portion 55 changes relatively, this change can be absorbed. The vertical cross-sectional shape of third bending portion 47 is not limited to the U-shape. For example, a mountain-shape contrary to this can be available.

Figure 5:
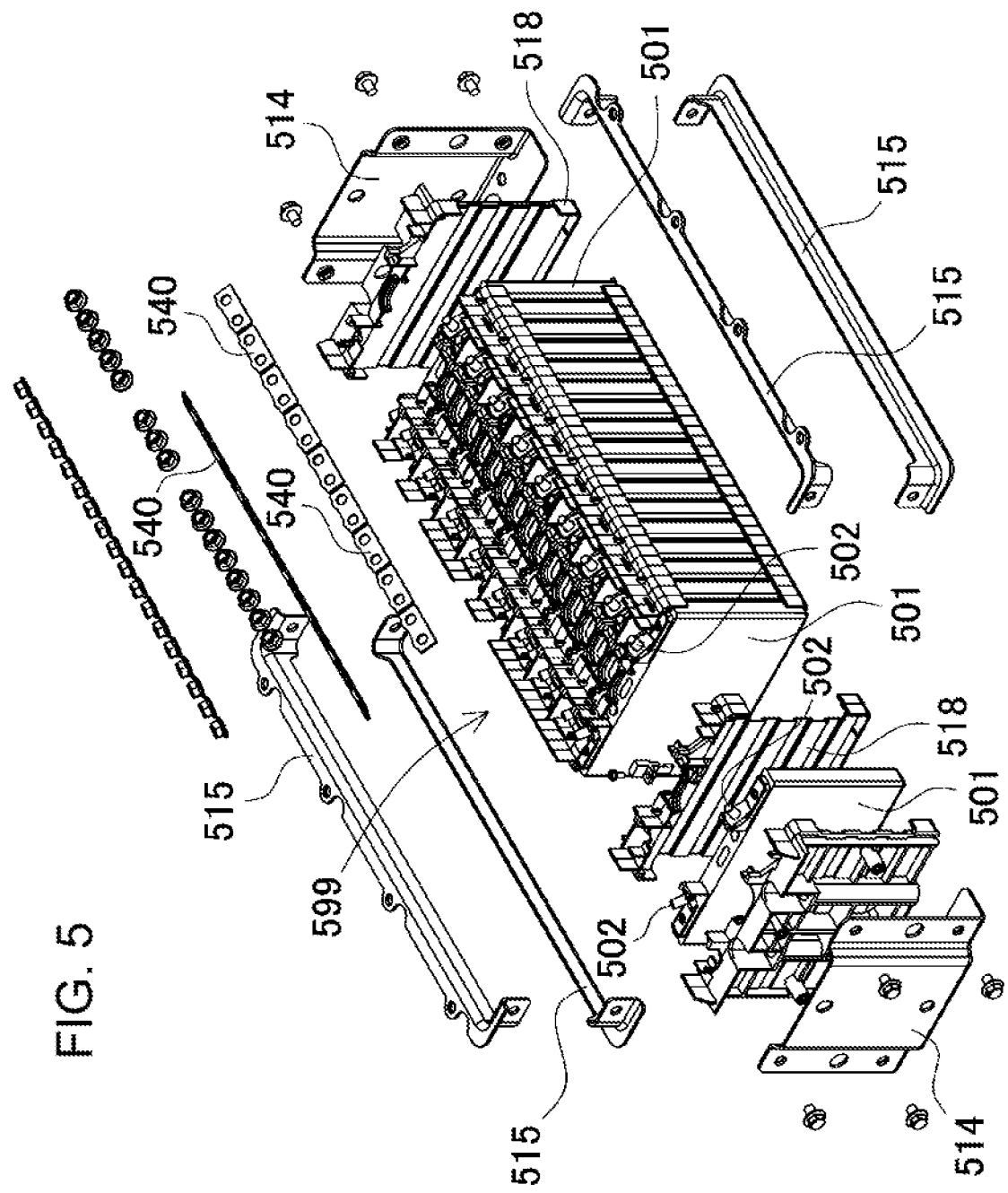
FIG. 5 is an exploded perspective view illustrating a connecting state between electrode terminals and bus bars of a comparative example.

First intermediate portion 45 and second intermediate portion 55 are disposed substantially in parallel. Second intermediate portion 55 and second connection portion 51 are disposed substantially in parallel. First intermediate portion 45 and second intermediate portion 55 are disposed substantially in parallel, preferably in the same plane. First intermediate portion 45 has a rectangular shape in a plan view, and first connection bending area 42 and third intermediate bending area 46 are provided at a substantially right angle, at the adjacent sides thereof. In the same way, second intermediate portion 55 has a rectangular shape in a plan view, and second connection bending area 52 and fourth intermediate bending area 56 are provided at a substantially right angle, at the adjacent sides thereof. As this result, as shown in FIG. 4, even though a distance between first connection portion 41 and second connection portion 51 changes relatively in the X axis direction, this change can be absorbed by deforming of third bending portion 47. Even though positions of first connection portion 41 and second connection portion 51 changes relatively in the Y axis direction, this change can be absorbed by deforming of first bending portion 43, second bending portion 53. Even though positions of first connection portion 41 and second connection portion 51 changes relatively in the Z axis direction, this change can be absorbed by deforming of first bending portion 43, second bending portion 53. In this way, even though a relative distance of first connection portion 41 and second connection portion 51 changes in any of the XYZ axis directions, this change can be absorbed by connecting portion 49 configured of first bending portion 43, first intermediate portion 45, second bending portion 53, and second intermediate portion 55. As mentioned above, in the exploded perspective view of FIG. 5, electrode terminals 502 are directly connected each other by bus bars 540 each having a flat board shape. Compared with this FIG. 5, the configuration of FIG. 4 can avoid problem of damage, break, or separation in the welding portion, which is caused by the load applied to the welding portion between electrode terminal 2 and bus bar 40 by a relative displacement between first connection portion 41 and second connection portion 51.

As mentioned above, since connecting portion 49 which connects first connection portion 41 and second connection portion 51 has a buffering structure which can be deformed in the XYZ axis directions, allowance of the battery cell at a time of manufacturing or assembling can be absorbed. Even though a displacement in a relative position between first connection portion 41 and second connection portion 51, occurs, at a time of using the power supply device, due to swell or expansion by charging/discharging of the battery cell, external force of impact or vibration, the displacement can be absorbed by the buffering structure of connecting portion 49. Then, this can avoid occurrence of damage, break, or separation in the welding portion, which is caused by the load directly applied to first connection portion 41 or second connection portion 51. Therefore, the reliability of connecting the battery cells can be enhanced.

In addition, the intermediate portion of bus bar 40 can be used as a detection terminal for detecting the intermediate potential. Especially, in a case where the lithium ion secondary battery is used as the battery cell, in order to manage a battery state precisely, detecting the intermediate potential is carried out. For this purpose, it is necessary that terminals for detecting the intermediate potential are connected. The intermediate portion having the buffering structure (impact absorbing structure) can be also used as a member for connecting the terminal of detecting the intermediate potential.

(Cutout for Connecting the Terminal)

In the example of FIG. 4, a cutout for connecting the terminal is formed at second intermediate portion 55 of one of the intermediate portions. In this example, an area (=square measure=size) of second intermediate portion 55 is larger than an area of first intermediate portion 45. Therefore, the cutout for connecting the terminal can be easily formed at a part thereof. The cutout for connecting the terminal is connecting hole 58 which is opened at second intermediate portion 55. Connecting hole 58 has a circular shape in a plan view in the example of FIG. 4. Connecting hole 58 having the circular shape, can be easily fixed by screwing the terminal for detecting the intermediate potential, and then a contacting area to the terminal can be large to reduce a contact resistance. The cutout for connecting the terminal can has a rectangular shape, an elongated circular shape, or an elliptic shape. The cutout is not limited to the hole shape, and can be a recess or the like.

(Thin Area 61)

Figure 6:
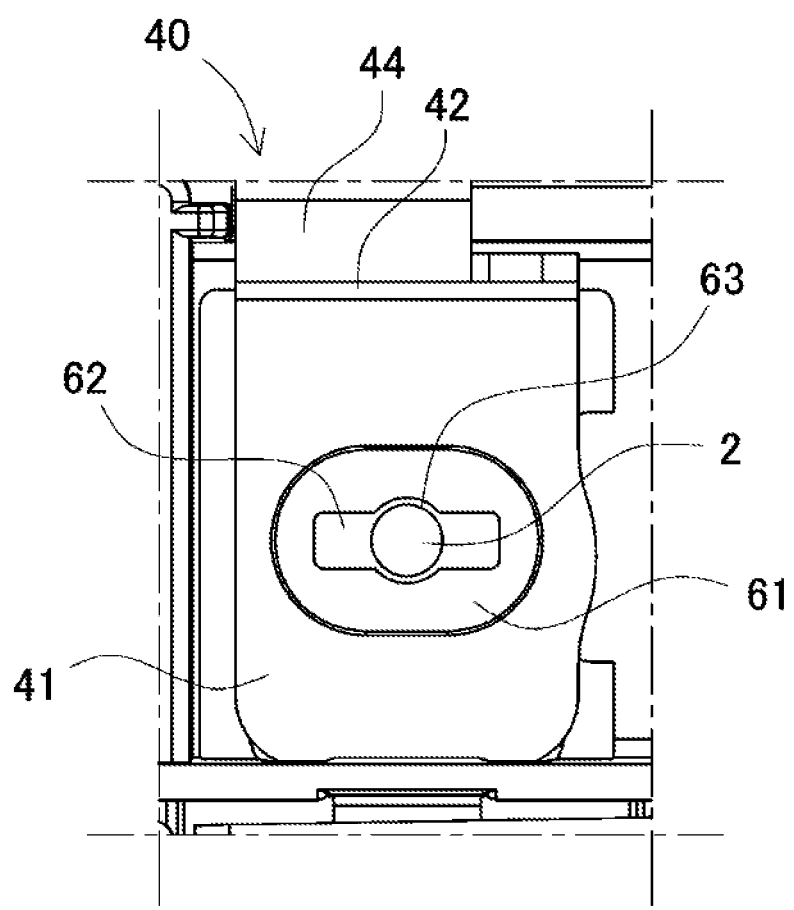
FIG. 6 is an enlarged plan view illustrating one example of a first connection portion of the bus bar.

Bus bar 40 has a welding area, that is, a joining area, for being laser welded to the electrode terminal 2 of the battery cell. Concretely, as one exemplary embodiment of the joining area, first connection portion 41 and second connection portion 51 each partially have a thin area 61 whose thickness is thinner than a thickness of the other area. As one example, an enlarged plan view illustrating thin area 61 of first connection portion 41, is shown in FIG. 6.

(Open Window 62)

Open window 62 is opened, formed at a part of thin area 61. At a time of laser welding, the laser beam is irradiated to the upper surface of thin area 61 which is stacked on, is disposed on, closely contacts, joining surface 2B of electrode terminal 2. Then, thin area 61 is welded to joining surface 2B, while thin area 61 is melted with joining surface 2B by the laser beam's penetrating. At this time, it is necessary to precisely position bus bar 40 and electrode terminal 2. Therefore, as shown in the enlarged plan view of FIG. 6, projecting portion 2A of electrode terminal 2 is exposed from open window 62, while they are used as the guide for positioning bus bar 40 and electrode terminal 2 relatively. Additionally, they are also used as another guide for positioning welding location where the laser beam is irradiated. For example, projecting portion 2A exposed from open window 62 is detected by image processing. Then, while this position is regarded as the reference position, scanning position of the laser beam is controlled. Thereby, the joining portion between bus bar 40 and the terminal base of electrode terminal 2 is formed.

Open window 62 has a rectangular shape extended in the stacked direction of the battery cells. Open window 62 having the rectangular shape can be formed to have a width bigger than a width of the outer diameter of projecting portion 2A of electrode terminal 2. However, preferably, the width of open window 62 having the rectangular shape is narrower than projecting portion 2A of electrode terminal 2, and also open window 62 is formed to be wider, substantially at a center of a longitudinal direction of open window 62, such that projecting portion 2A can be inserted. While this structure prevents projecting portion 2A from being incorrectly inserted into the portion of the narrow width, Joining surface 2B of the terminal base can be exposed from open window 62 located at the both sides of projecting portion 2A. Joining surface 2B exposed from open window 62, is used for detecting a height of the bus bar. The area of open window 62 is suppressed in a small one, and thus an area where it is possible to be laser welded, can be secured by the part, to improve connecting strength. In the example of FIG. 6, wide width area 63 having a circular arc shape along the circular outer shape of projecting portion 2A, is formed, at the center of open window 62 having the rectangular shape which is long in the longitudinal direction.

(Shape of Thin Area 61)

Figure 7:
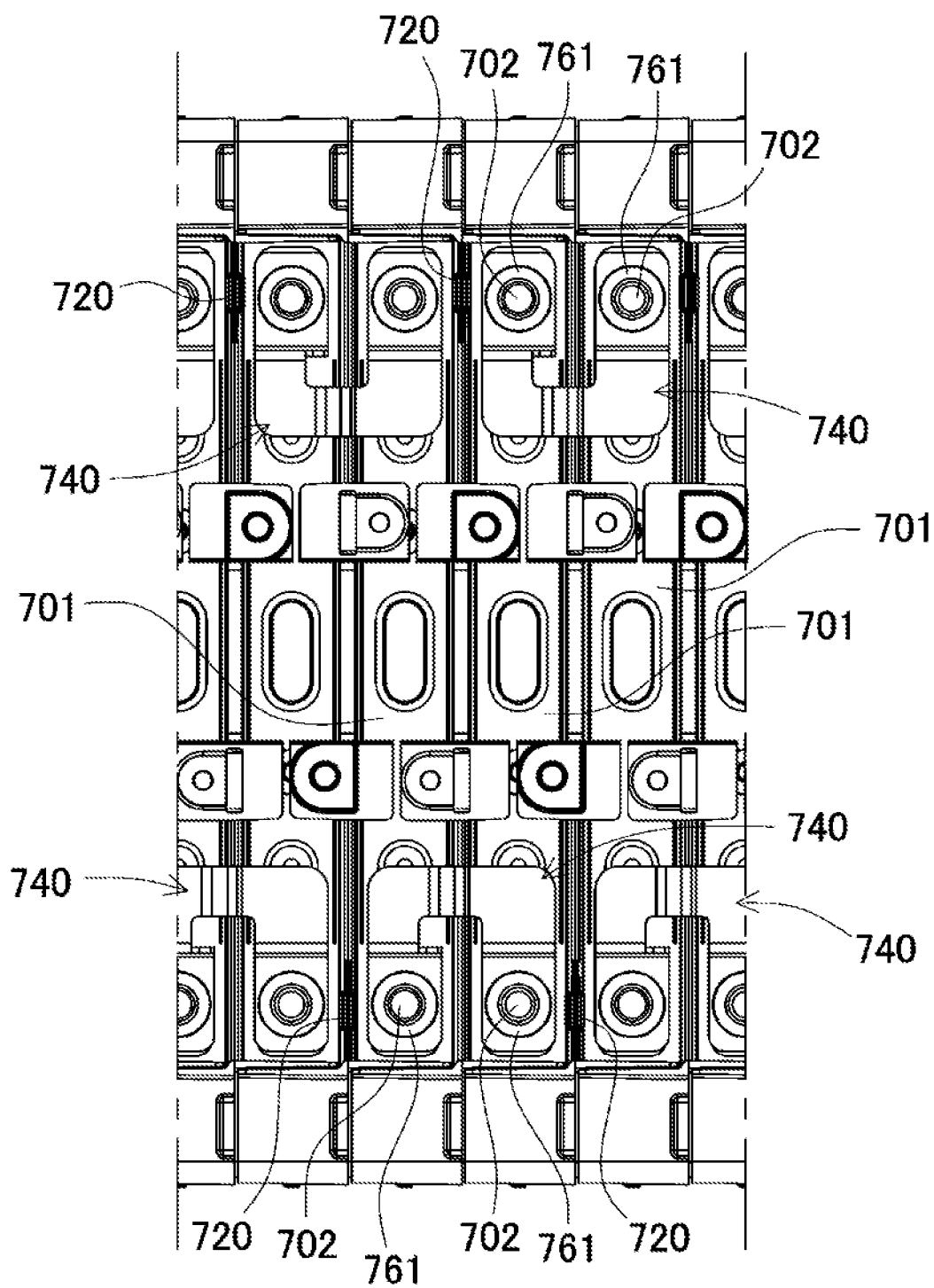
FIG. 7 is a plan view illustrating a battery stacked body of a comparative example.
Figure 8:
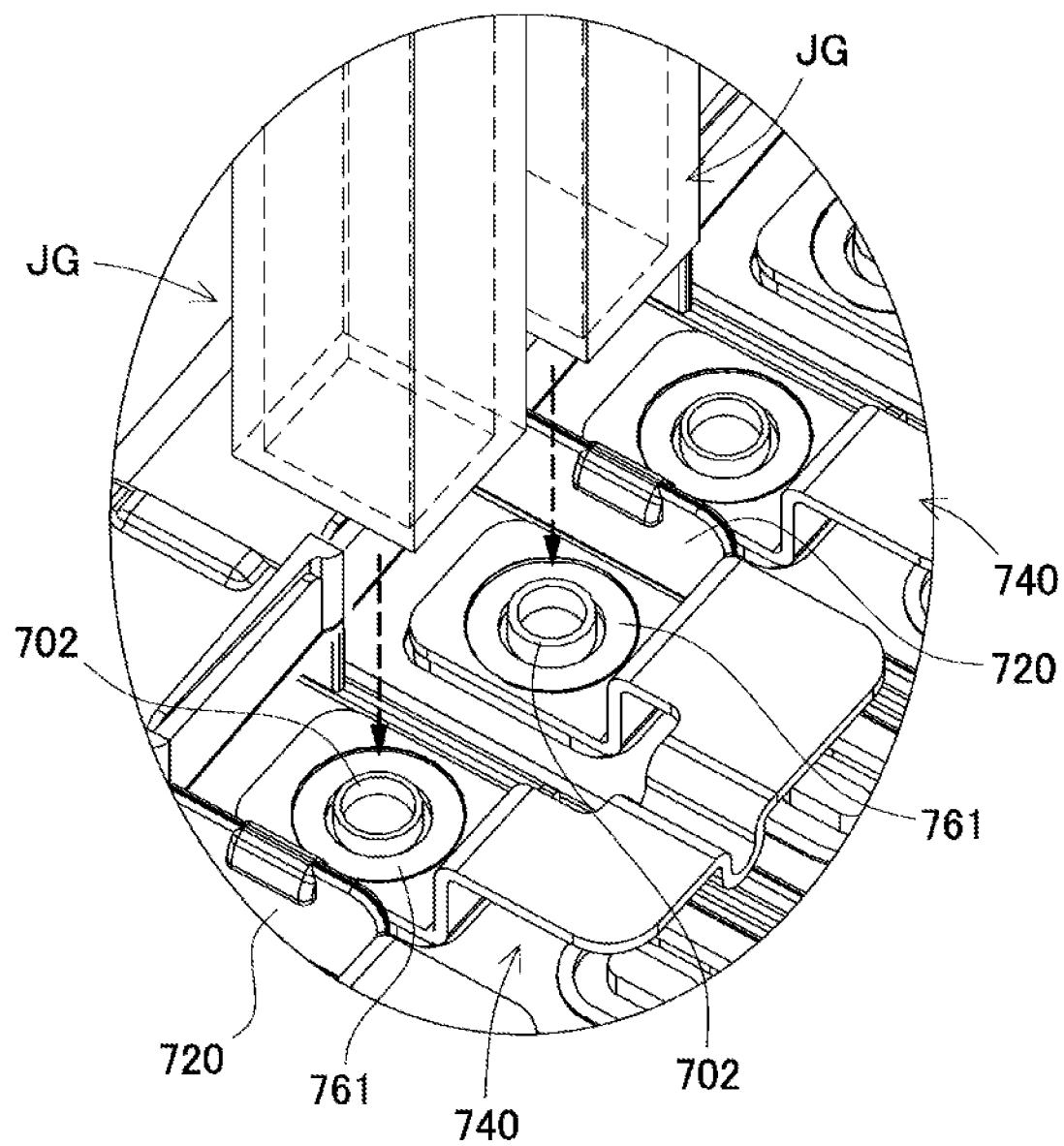
FIG. 8 is a perspective view illustrating a state where a jig presses the bus bar of FIG. 7.
Figure 9:
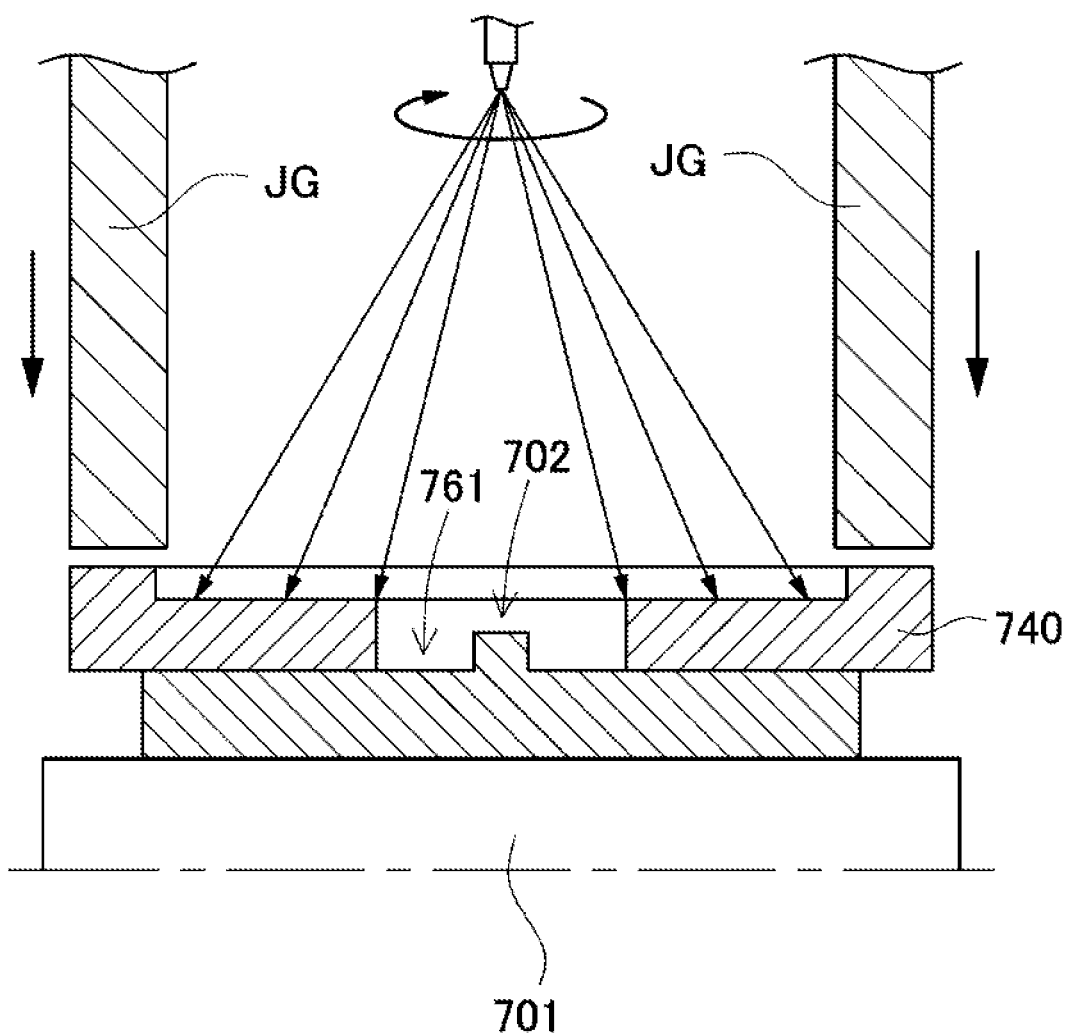
FIG. 9 is a sectional view illustrating a state where the jig of FIG. 8 has pressed the bus bar.

Thin area 61 hole has an elongated circular shape or an elongated elliptic shape in the stacked direction of the battery cells. Thus, both of downsizing of the bus bar and securing of the strength of laser welding can be carried out. This is explained in the following, based on a comparative example shown in FIGS. 7 to 10. Thin area 761 of the comparative example has a circular shape. As shown in the plan view of FIG. 7, bus bar 740 of this configuration is welded to electrode terminal 702 of a battery stacked body where plural sheets of battery cells 701 are stacked. At a time of this welding, as shown in a perspective view of FIG. 8, in a state where each of bus bars 740 is disposed on electrode terminal 702 of battery cell 701, bus bar 740 is pressed from the upper surface thereof, by using jig JG. Then, by scanning the laser beam shown in a sectional view of FIG. 9, bus bar 740 is welded to electrode terminal 702. However, in this configuration, as shown in an enlarged plan view of FIG. 10, it is necessary that pressing area PA pressed by jig JG are provided at the periphery of laser welding pattern LP. Thus, it is necessary that an area of bus bar 740 becomes large by this part. When the above-mentioned laser welding is carried out without increasing a size of the bus bar, an area capable of being welded becomes small in a relation with disposing space of the jig or an insulating wall, to prevent the welding strength of the bus bar from being improved.

In this exemplary embodiment, as shown in FIG. 6, thin area 61 is not a circular shape, but an elongated circular shape or an elliptic shape elongated in the stacked direction of battery cells 1, that is, the transverse direction in the figure, conversely shortened vertically. Pressing areas where bus bar 40 is pressed by jigs JG' at the time of welding, are omitted at the right and left sides in the stacked direction of battery cells 1, and then the pressing areas are disposed only in the upper-lower direction, while sandwiching thin area 61. Thus, the space where the jig is disposed in the comparative example, can be used for welding, and then it is possible to increase the joining strength by the part correspondingly. In addition, a comparatively large size of the jig can be used, and it is possible to press the pus bar to the electrode terminal. As the result, it is unnecessary to secure a large area in the right and left direction of the bus bar, to contribute to the downsizing of the bus bar.

(Decentered Disposition of Open Window 62)

As open window 62 is provided at thin area 61, thin area 61 is divided substantially into two parts, in the vertical direction, that is, in the direction of the short side in the elliptic shape. In the example of the plan view of FIG. 6, open window 62 is disposed, substantially at the center in the direction of the short side of the elliptic shape of thin area 61, in other word, the direction (the upper-lower direction in the figure) crossing the stacked direction of battery cells 1. Preferably, as shown in a modified example of FIG. 12, open window 62 is disposed at a location decentered in the direction away from first connection bending area 42 in the direction of the short side. Thus, an area of laser welding pattern LP which is scanned with laser light, can be kept large in first connection bending area 42 side. As mentioned above, the relative misalignment between first connection portion 41 and second connection portion 51 is absorbed by the deformation of connecting portion 49 in bus bar 40. In terms of first connection portion 41, first connection portion 41 is coupled to first bending portion 43 through first connection bending area 42. When battery cells 1 adjacently disposed are relatively misaligned and the positions of electrode terminals 2 displace, bus bar 40 tries to absorb such a displacement. In other words, first connection bending area 42 bends. Bending of first connection bending area 42 is applied to a direction where first connection portion 41 is separated from joining surface 2B of electrode terminal 2. In other words, there is the following tendency. In thin area 61 as the joining area of first connection portion 41, more stress is applied to a side near first connection bending area 42. Then, in order to more strongly weld the portion which is apt to receive such a stress, open window 62 is disposed at the location decentered in the direction away from first connection bending area 42 in thin area 61, so as to weld in a large area at the side near first connection bending area 42. As the result, in the upper and lower thin areas at the long sides in the elliptic shape of the thin area, the upper side area near first connection bending area 42 is larger than the lower side area away therefrom. Therefore, laser welding is continuously carried out in a large area, to easily perform stronger joining strength. Then, problems of separation, break in this portion can be avoided, and an improvement of the reliability of laser welding connecting the battery cells can be contributed.

Figure 12:
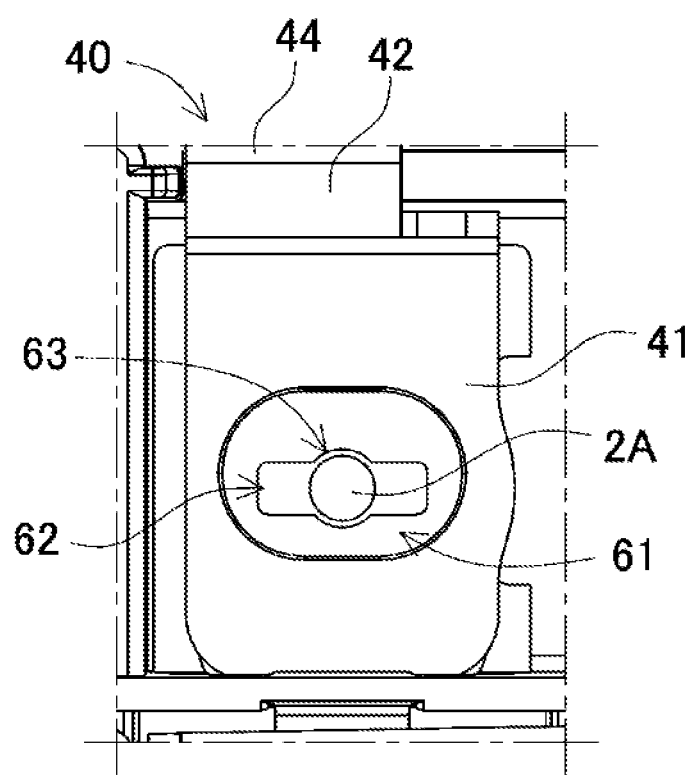
FIG. 12 is an enlarged plan view illustrating a first connection portion of a bus bar in a modified example.
Figure 13:
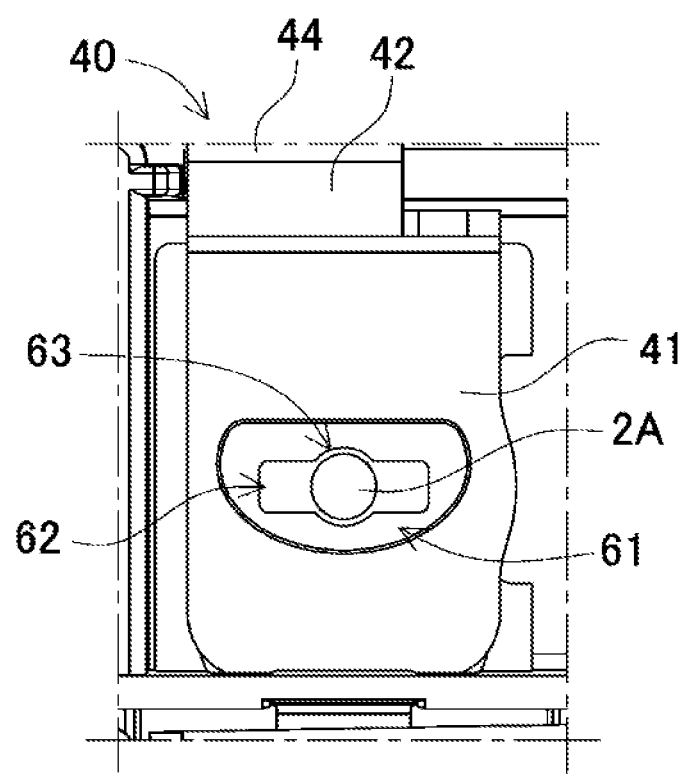
FIG. 13 is an enlarged plan view illustrating a first connection portion of a bus bar in another modified example.
Figure 16:
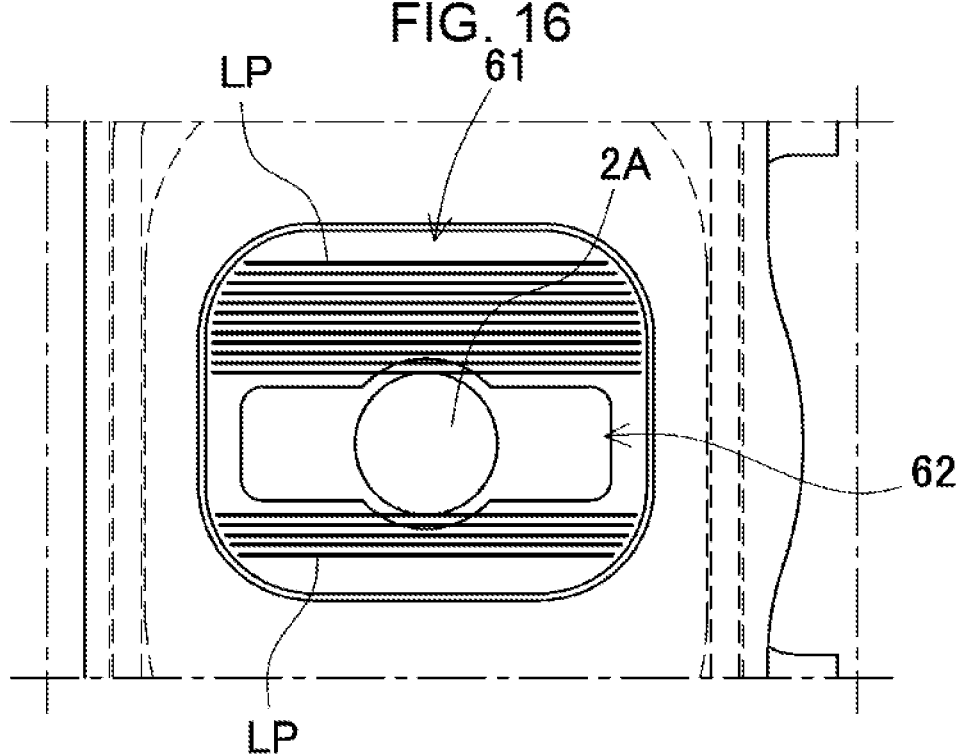
FIG. 16 is an enlarged plan view illustrating another example of a laser welding pattern.
Figure 17:
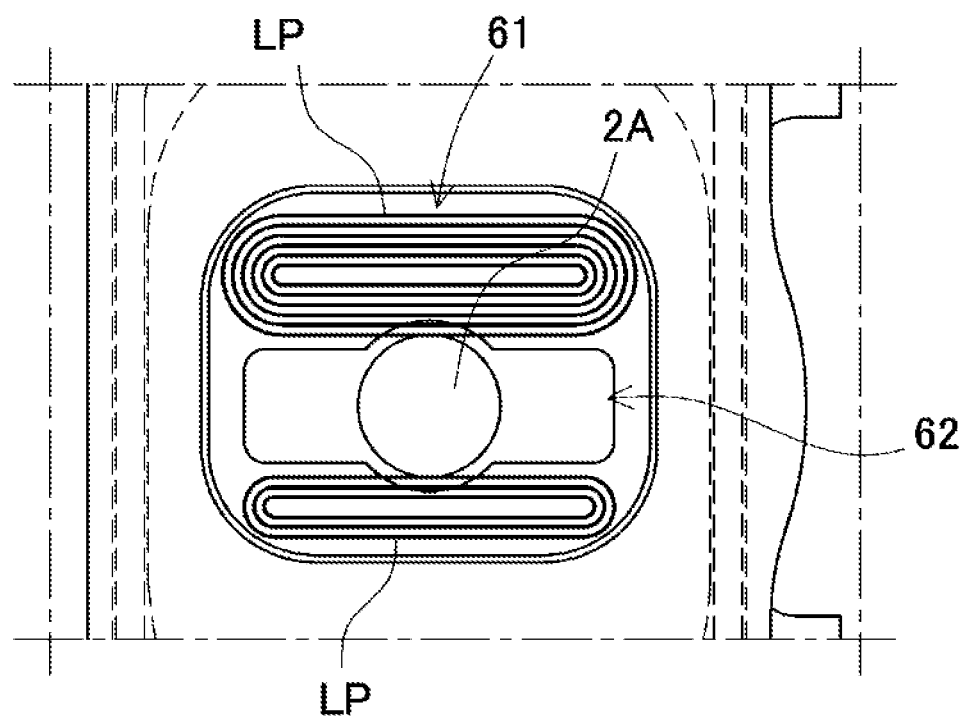
FIG. 17 is an enlarged plan view illustrating further another example of a laser welding pattern.

Additionally, from the above-mentioned view point, it is preferable that the elliptic shape of thin area 61 has a linear area in first connection bending area 42 side. In circular thin area 761 of the comparative example shown in FIG. 10, a stress is applied to a direction where first connection portion 41 is separated as mentioned above. In this case, the stress is concentrated at a nearest point CP to first connection bending area 42. When the stress is concentrated at one point, the possibility of the break or the like is increased. Therefore, as shown in FIGS. 6, 12, the elliptic shape of thin area 61 has the linear area at the side near first connection bending area 42, and the stress can be received at, not a point, but a line, and then the durability is increased, to contribute the improvement of the reliability. From this view point, it is preferable that the elliptic shape of thin area 61 has a track shape where the long sides are respectively of linear shapes. Alternatively, as shown in a modified example of FIG. 13, the elliptic shape of thin area 61 can have a linear shape only at the side near first connection bending area 42. Further, as shown in FIG. 17 described below, the rectangular shape with corners cut can be used. The elliptic shape used in this specification includes and means these shapes. In addition, from the view point of stress concentration, the joining portion is not necessarily limited to the elliptic shape. As long as the linear joining portion is provided in a direction transverse to the separating direction, when big force is applied to the bus bar, the break of the bus bar can be prevented. Therefore, for example, as shown in another exemplary embodiment illustrated in FIGS. 13 and 16, the laser beam can be scanned so as to form a plurality of linear joining portions extended in a direction of the long diameter of thin area 61. As mentioned above, since the stress is concentrated at the side near first connection bending area 42, preferably, a region where the linear joining portion is formed at the side near first connection bending area 42, is larger than a region where a linear joining portion is formed at a side away from first connection bending area 42.

Figure 11:
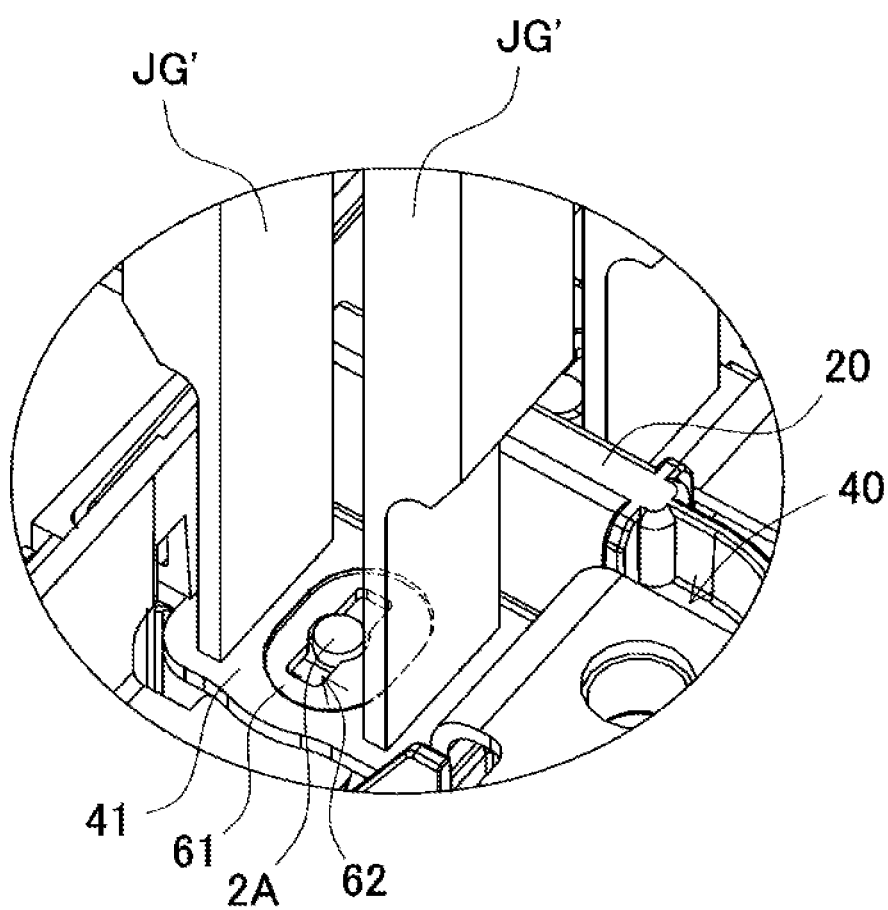
FIG. 11 is a perspective view illustrating a state where a jig presses the bus bar of FIG. 6.

As mentioned above, the elliptic joining portion is formed in the elliptic shape such that the short diameter direction is at connecting portion 49 side, or the linear joining portion is formed at connecting portion 49 side. Therefore, the joining strength can be enhanced against the stress which is applied in the direction where first connection portion 41 is separated. Since the joining strength Is enhanced, it is possible that the bus bar is configured of an inexpensive metal board. Conventionally, from the view point of the reliability of the joining strength, the bus bar used in the laser welding is made of a dad material. Recently, as a battery cell, a lithium Ion secondary battery of high capacity has been spread. In this lithium ion secondary battery, generally, the positive electrode is made of aluminum, and the negative electrode is made of copper. When these lithium ion secondary batteries are connected each other in series by the bus bars, it is necessary, that the positive electrode made of aluminum in one of the lithium Ion secondary batteries, is connected to the negative electrode made of copper in another of the lithium ion secondary batteries by the bus bars. Thus, metal materials of the positive and negative electrodes are different. However, When these different kinds of metals are joined each other by laser welding, the intermetallic compound is made, and then there is a problem that the mechanical strength at the joining portion is decreased. In order to avoid this, the bus bar is made of a clad material which is joined by specially rolling the copper plate and aluminum plate. By using this dad material as a bus bar, aluminum plates are contacted in the positive electrode, and copper plates are contacted, to prevent the intermetallic compound from being made. Then, laser welding of the high reliability can be obtained. However, there is a problem that the bus bar made of the clad material is expensive. On contrast, by contriving jig JG' above-mentioned, jigs are not disposed in the stacked direction of battery cells 1, as shown in FIG. 11. Thus, the thin area capable of being welded is increased by the part correspondingly, and the joining strength is secured by enlarging the area of laser welding. As a result, without a clad material, the bus bar configured of only one metal plate (=board), can be utilized, to largely reduce costs. In this example, the bus bar is made of inexpensive aluminum, but it can be made of copper.

Further, depending on the need, plating can be given to the surface of the electrode terminal. When the negative electrode terminal made of copper is joined with the bus bar made of aluminum as a different metal joining, a local cell by a potential difference is formed, and the galvanic corrosion (different metal contact corrosion) is caused. Then, there is a possibility that the strength is decreased and the electric resistance is degraded. Therefore, nickel plating is given to the surface of the negative electrode terminal made of copper, to enhance an effect of corrosion prevention.

Further, there is a merit that laser welding can be done by nickel plating. Since the surface of the electrode terminal made of copper is glossy, the irradiating laser beam is reflected on its surface, and heating and melting by the laser beam irradiation is difficult. On contrast, by giving nickel plating to the surface, the nickel plating layer is melted in advance due to the difference of the melting points of nickel and copper, and copper is easily melted. As a result, the gloss of the surface of copper is lost, and the laser beam is not reflected and is absorbed relatively. Since melting is promoted, it is possible that laser welding progresses smoothly.

(Manufacturing Method of the Power Supply Device)

As a manufacturing method of the power supply device, a method where bus bar 40 is laser welded to electrode terminal 2, is explained in the following. The battery stacked body where the plural sheets of battery cells 1 having positive and negative electrode terminals 2 at one surface are stacked, is prepared. Then, bus bar 4 is disposed, while being positioned on electrode terminals 2 of adjacent battery cells 1. Further, by scanning the laser beam on the thin area, bus bar 40 is welded and joined to electrode terminal 702.

(Laser Welding Pattern LP)

Figure 14:
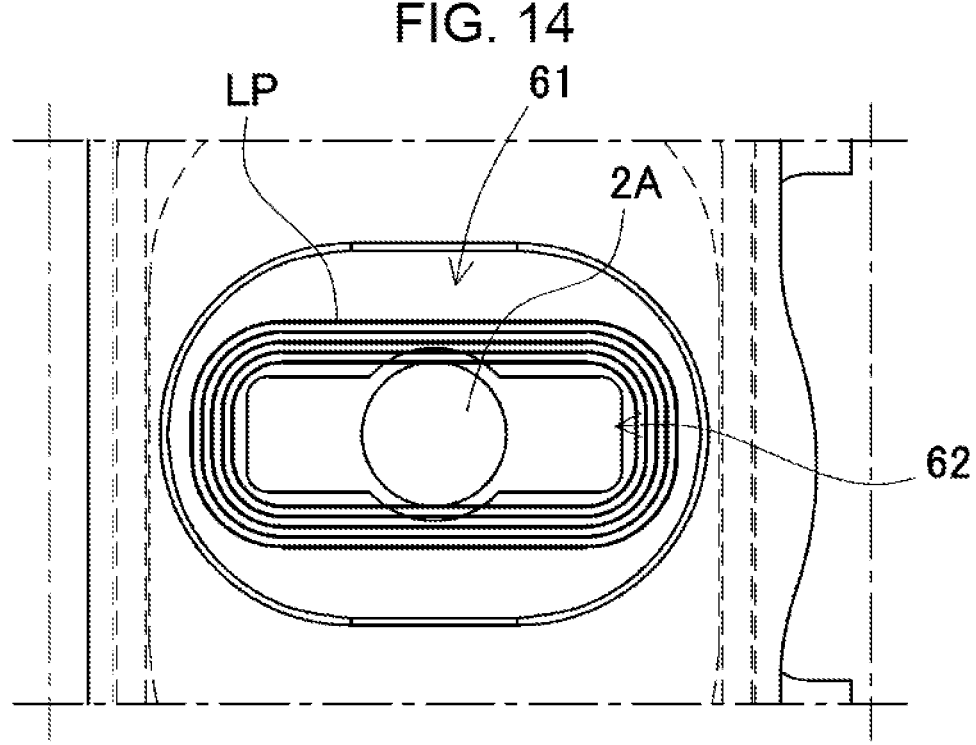
FIG. 14 is an enlarged plan view illustrating one example of a laser welding pattern in the bus bar of FIG. 6.

Next, thin area 61 of the elliptic shape shown in FIG. 6 is scanned with the laser beam by using a scanning pattern, that is, laser welding pattern LP shown in a plan view of FIG. 14. As shown by the bold lines in this figure, in the example where open window 62 is formed substantially at the center of thin area 61, the laser beam is scanned according to the elliptic shaped pattern so as to surround the periphery of open window 62 by many times. Thereby, the elliptic joining portion which joins bus bar 40 and the terminal base of electrode terminal 2 in the elliptic shape, is formed.

Figure 15:
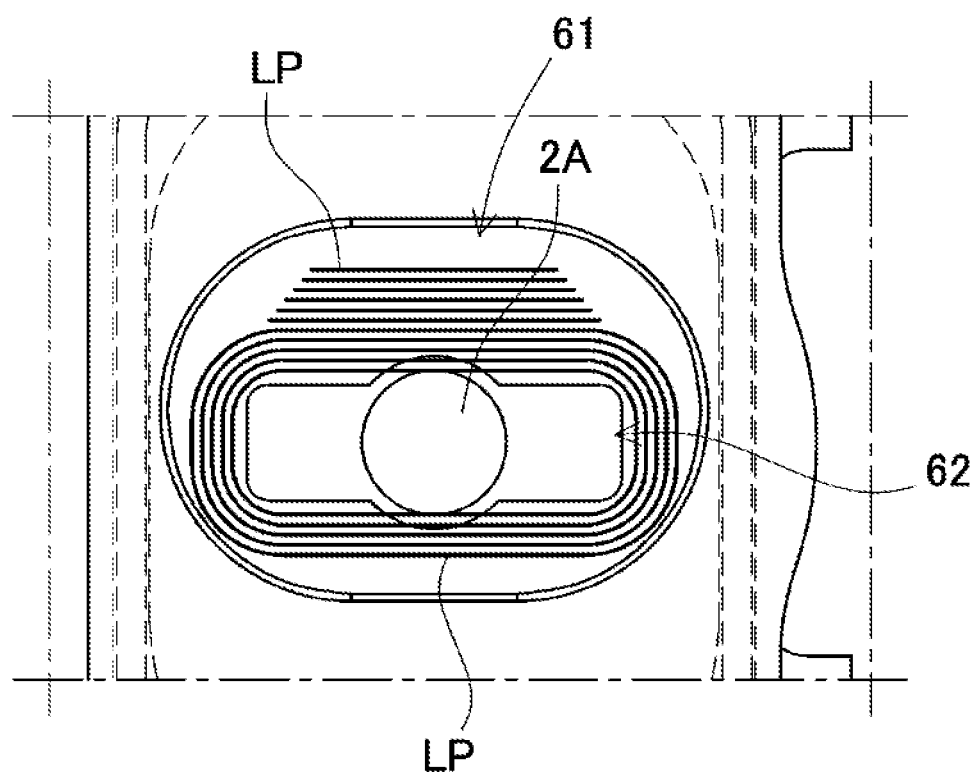
FIG. 15 is an enlarged plan view illustrating one example of a laser welding pattern in the bus bar of FIG. 12.

As shown in the plan view of FIG. 12, open window 62 is disposed at a location decentered toward lower such that first connection bending area 42 side is kept large. As shown in an enlarged plan view of FIG. 15, the laser beam is scanned in a circular arc shape such that the laser beam is rotated around the periphery of open window 62. In addition, at the upper large area, the laser beam is scanned so as to reciprocate laterally, to enable to efficiently scan the laser beam. As the order of scanning the laser beam, firstly the laser beam is scanned in a spiral shape from inside toward outside. After scanning in a ring shape having a predetermined width is finished, at the upper side of open window 62, the laser beam is scanned by the linear reciprocatory scan in the lateral direction. When the laser beam arrives at one of both ends of the reciprocatory scan, the laser beam is moved from bottom to top, to repeat the reciprocatory scan. Alternatively, in stead of moving at the one of both ends, the laser beam can be scanned in a zigzag shape.

In the above examples, the laser beam is also scanned at the right and left sides of open window 62, that is, spaces between open window 62 and thin area 61 in the stacked direction of battery cells 1, to secure the joining area (=square measure=size) welded by laser. According to this configuration, the joining area is increased, and the joining strength is enhanced. However, the present invention is not limited to this configuration. Only the upper and left sides of the open window can be laser welded without laser welding the right and left sides of the open window. Especially, in a case where there is almost no thin area 61 at the right and left sides of the open window as the result of further downsizing the bus bar, or in a case where it is difficult to precisely control the scan of the laser beam due to a scanning accuracy of the laser beam, the scan by the laser beam at these portions can be omitted, to enable cycle time to be shortened while work steps are simplified. Such a example is shown in FIG. 16 or 17 as a modified example. In the example of FIG. 16, the laser welding is carried out by the reciprocatory scan in the lateral direction at the upper and left sides of open window 62. Especially, this scan pattern is effective, when thin area 61 is near a rectangular shape rather than a circular shape. Alternatively, as shown in FIG. 17, the laser beam is scanned in a spiral shape at the upper and left sides of open window 62. Then, the laser welding can be carried out, so as to cover these areas.

As mentioned above, the thin area is an area for laser welding to the electrode terminal. However, it is not necessary to weld at the whole thin area, and a part of the thin area may not be welded. Depending on a scan speed of the laser beam, a required connecting strength, or the like, it is enough to laser weld a necessary area(=square measure=size) of the thin area. Such a exemplary embodiment is also within the scope of the present invention.

The power supply device described above can be used for a vehicle-mounted power supply. Examples of a vehicle having a power supply device mounted include electric vehicles such as hybrid cars or plug-in hybrid cars driven by both an engine and a motor, or electric-motor driven automobiles such as electric automobiles only driven by a motor. The power supply device can be used for power supplies of these vehicles.

(Power Supply Device for Hybrid Automobile)

Figure 18:
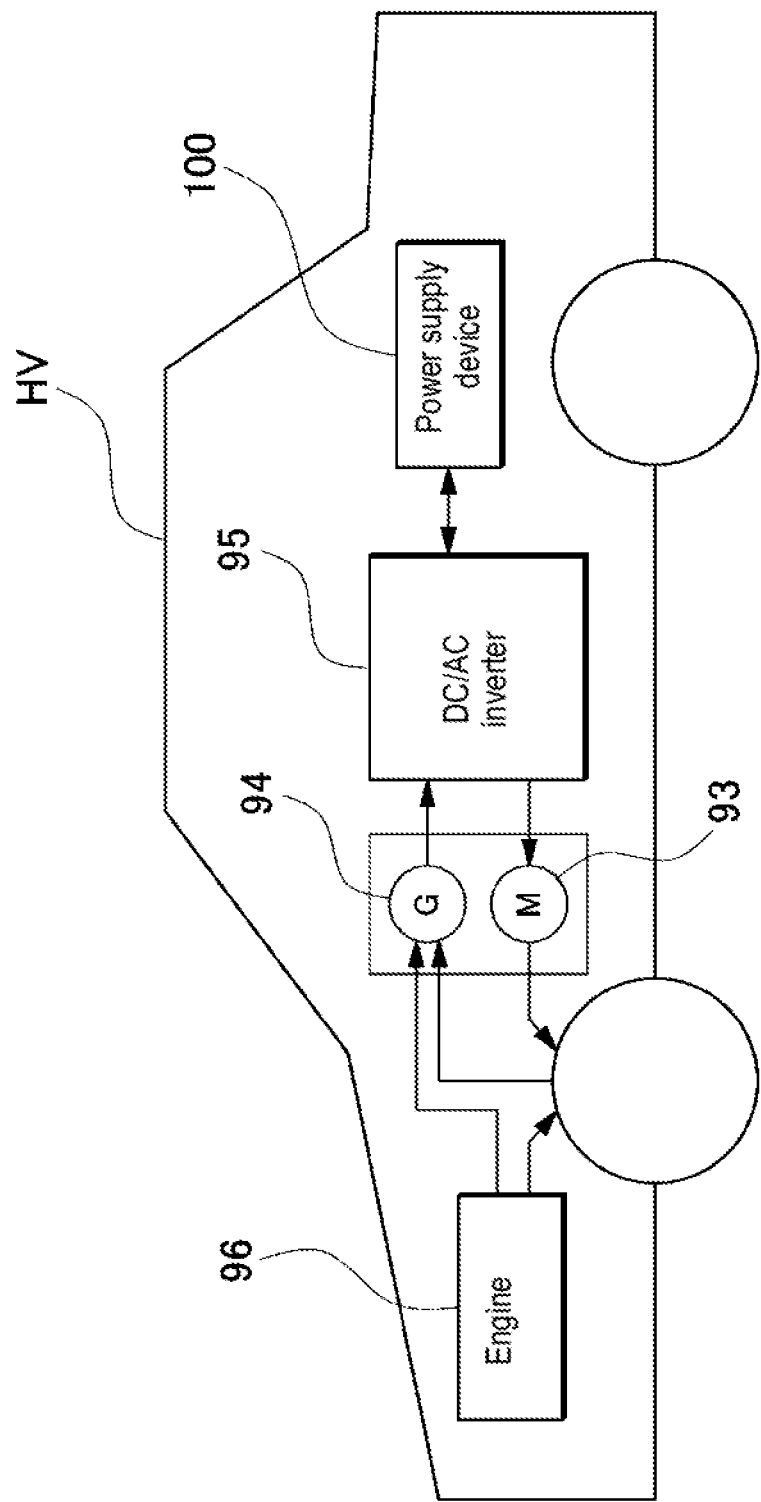
FIG. 18 is a block diagram showing an example in which a power supply device is mounted on a hybrid car driven by both an engine and a motor.
Figure 19:
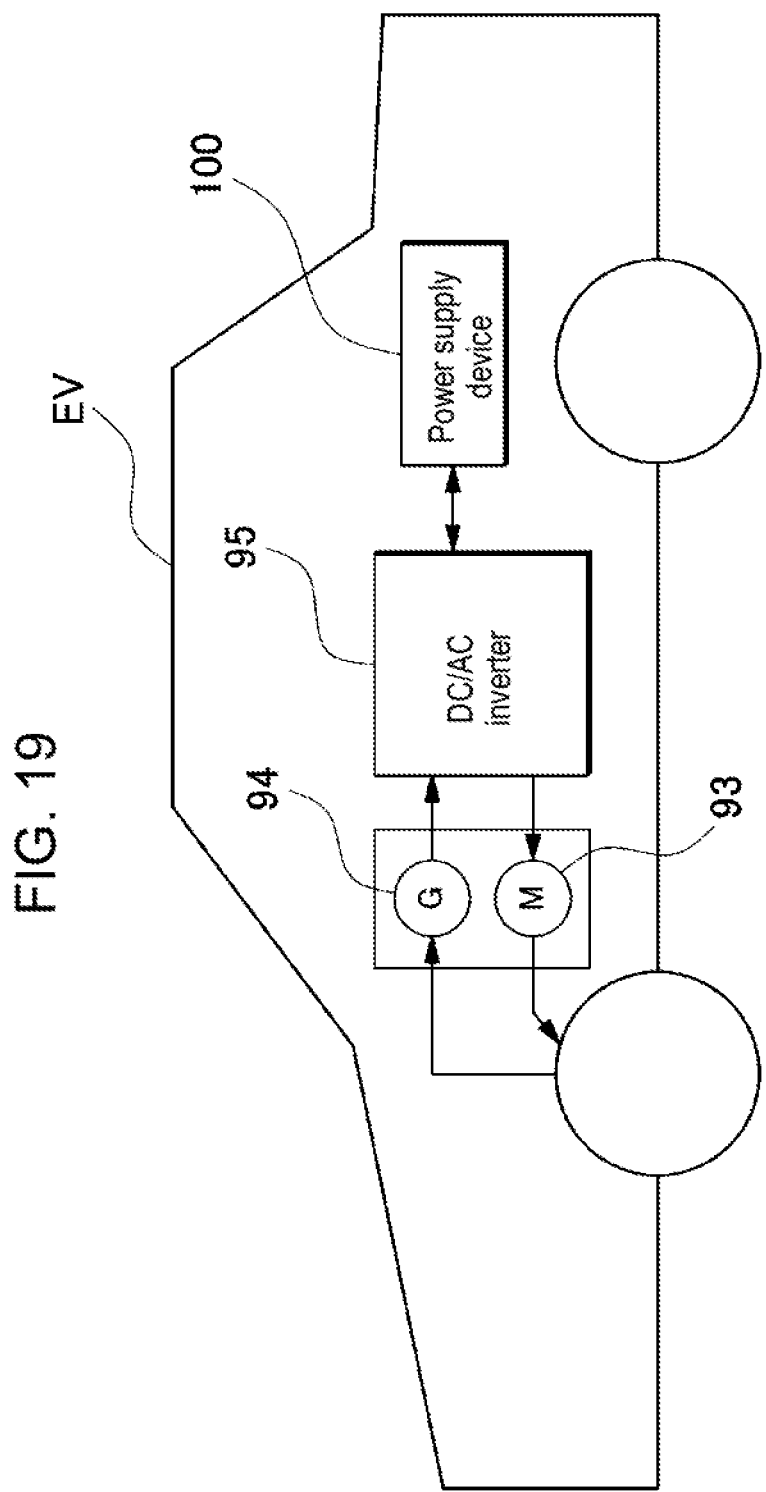
FIG. 19 is a block diagram showing an example in which a power supply device is mounted in an electric car traveling only by a motor.

FIG. 18 shows an example in which a power supply device Is mounted on a hybrid car driven by both an engine and a motor. Vehicle HV equipped with a power supply device that is shown in this drawing includes: engine 96 and motor 93 for travel that make vehicle HV travel; power supply device 100 for supplying power to motor 93; and power generator 94 for charging the battery in power supply device 100. Power supply device 100 is connected to motor 93 and power generator 94 via direct current (DC)/alternating current (AC) inverter 95. Vehicle HV travels by both of motor 93 and engine 96 while charging and discharging the battery of power supply device 100. Motor 93 is driven when the engine efficiency is low, for example during acceleration or low-speed travel, and makes the vehicle travel. Motor 93 receives power from power supply device 100 and is driven. Power generator 94 is driven by engine 96 or is driven by regenerative braking when the vehicle is braked, and the battery of power supply device 100 is charged.

(Power Supply Device for Electric Car)

Figure 10:
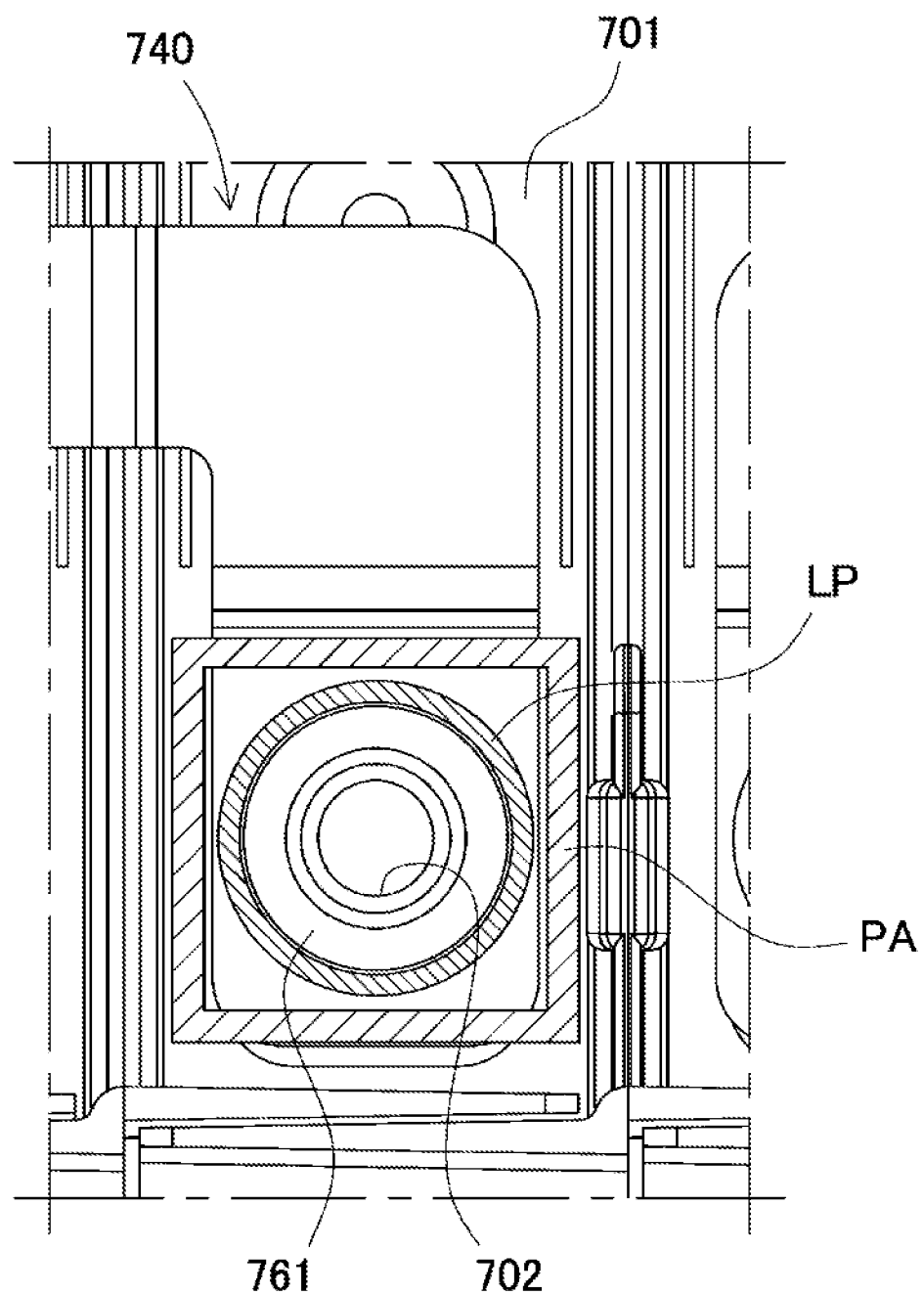
FIG. 10 is an enlarged plan view illustrating an area which is pressed by the jig in the bus bar of FIG. 7.

FIG. 10 shows an example in which a power supply device is mounted in an electric car traveling only by a motor. Vehicle EV equipped with a power supply device that is shown in this drawing includes: motor 93 for travel that makes vehicle EV travel; power supply device 100 for supplying power to motor 93; and power generator 94 for charging the battery in power supply device 100. Motor 93 receives power from power supply device 100 and is driven. Power generator 94 is driven by energy when regenerative braking is applied to vehicle EV, and the battery of power supply device 100 is charged.

INDUSTRIAL APPLICABILITY

A power supply device, a vehicle using this, a bus bar, or a manufacturing method of a power supply device according to the present invention can be suitably used as power supply devices of plug-in hybrid vehicles that can switch between the EV drive mode and the HEV drive mode, hybrid electric vehicles, electric vehicles, and the like. The power supply device can be appropriately used for the following applications: a backup power supply device mountable in a rack of a computer sever; a backup power supply device used for wireless base stations of mobile phones; a power source for storage used at home or in a factory; an electric storage device combined with a solar battery, such as a power source for street lights; and a backup power source for traffic lights.

The invention claimed is:

1. A power supply device, comprising:
   a battery stacked body including a pair of battery cells which are adjacently stacked and each have an electrode terminal, wherein the battery stacked body has the electrode terminals on a surface of the battery stacked body;
   a bus bar electrically connecting the pair of battery cells; and
   a joining portion joining the electrode terminal of one of the pair of battery cells to the bus bar, and including an elliptic joining portion which joins the electrode terminal to the bus bar in an elliptic shape,
wherein the electrode terminal joined to the bus bar includes a terminal base having a joining surface,
the bus bar is disposed so as to overlap the joining surface, and
the joining portion is located between the terminal base and the bus bar,
wherein the bus bar has an open window which exposes a part of the joining surface of the terminal base, and
wherein the bus bar partially has a thin area whose thickness is thinner than a thickness of an other area, and the thin area is formed in an elliptic shape which surrounds the open window.

2. The power supply device according to claim 1,
wherein the bus bar includes a connection portion which has an area joined to the electrode terminal by the joining portion, and a connecting portion which is coupled to the connection portion, and
the elliptic joining portion has an elliptic shape whose short diameter direction is at a side of the connecting portion.

3. The power supply device according to claim 2,
wherein the joining portion further includes a linear joining portion which joins the electrode terminal and the bus bar in a linear shape, and the linear joining portion is provided at a side of the connecting portion.

4. The power supply device according to claim 2,
wherein the connecting portion includes a bending portion which is formed in a U-shape in a sectional view.

5. A vehicle comprising the power supply device according to claim 1.

6. The power supply device according to claim 1, wherein
an overall dimension of the bus bar in a thickness direction is smaller in the thin area than in the other area, the thickness direction being perpendicular to the surface of the battery stacked body on which the electrode terminals are disposed.

7. A power supply device, comprising:
a battery stacked body including a pair of battery cells which are adjacently stacked and each have an electrode terminal that includes a terminal base having a joining surface, wherein the battery stacked body has the electrode terminals on a surface of the battery stacked body;
a bus bar electrically connecting the pair of battery cells, wherein the bus bar is disposed so as to overlap the joining surface, and has an open window which exposes a part of the joining surface of the terminal base; and
a joining portion joining the electrode terminal of one of the pair of battery cells to the bus bar, and including a plurality of linear joining portions which join the electrode terminal and the bus bar in a linear shape, and between which the open window is located,
wherein the bus bar partially has a thin area whose thickness is thinner than a thickness of an other area, and the thin area is formed in an elliptic shape which surrounds the open window.

8. The power supply device according to claim 7,
wherein the bus bar includes a connection portion which has an area joined to the electrode terminal by the joining portion, and a connecting portion which is coupled to the connection portion, and
the plurality of linear joining portions includes a first linear joining portion which is located at a side of the connecting portion to the open window, and a second linear joining portion which is located at an opposite side,
a region where the first linear joining portion is formed at the side of the connecting portion, is larger than a region where the second linear joining portion is formed at the opposite side.

9. The power supply device according to claim 8,
wherein the connecting portion includes a bending portion which is formed in a U-shape in a sectional view.

10. The power supply device according to claim 7, wherein
an overall dimension of the bus bar in a thickness direction is smaller in the thin area than in the other area, the thickness direction being perpendicular to the surface of the battery stacked body on which the electrode terminals are disposed.

11. A bus bar for connecting electrode terminals of battery cells, comprising a thin area, and an other area,
wherein the bus bar partially has a thin area whose thickness is thinner than a thickness of the other area,
an open window is opened and formed at a part of the thin area,
the thin area has an elongated elliptic shape in a stacked direction of the battery cells, and
the open window is extended in a direction along a long side of the elliptic shape.

12. An electrical connection method of battery cells, for electrically connecting a pair of battery cells having electrode terminals, comprising:
a step of disposing the pair of battery cells adjacently in a posture where the electrode terminals of the battery cells are adjacent to each other;
a step of preparing a bus bar, which has an open window of an elongated hole shape, and partially has a thin area whose thickness is thinner than a thickness of an other area;
a step of positioning the bus bar by inserting a part of the electrode terminal into the open window,
a step of disposing the bus bar on the electrode terminal so as to overlap the thin area to the electrode terminal;
a step of pressing the bus bar to the electrode terminal by using a jig which presses the bus bar; and
a step of welding and joining the bus bar and the electrode terminal by scanning a laser beam in an elliptic shape at the thin area.

13. A power supply device, comprising:
a battery stacked body including a pair of battery cells which are adjacently stacked and each have an electrode terminal, wherein the battery stacked body has the electrode terminals on a surface of the battery stacked body;
a bus bar electrically connecting the pair of battery cells; and
a joining portion joining the electrode terminal of one of the pair of battery cells to the bus bar,
wherein the bus bar, in a plan view, has a thin area and an other area adjacent to the thin area;
the thin area is formed in an elliptic shape and is located to overlap the electrode terminal, wherein at least a part of the joining portion is formed within the thin area; and
the bus bar has a first height in the thin area and a second height in the other area in a direction perpendicular to the surface of the battery stacked body on which the electrode terminals are disposed, wherein the first height is less than the second height.

14. The power supply device according to claim 13, wherein the joining portion includes an elliptic joining portion which joins the electrode terminal to the bus bar in an elliptic shape.

15. The power supply device according to claim 13, wherein the joining portion includes a plurality of linear joining portions which join the electrode terminal and the bus bar in a linear shape.

* * * * *